（12） United States Patent
Fukutani et al.

(10) Patent No.: US 8,087,815 B2
(45) Date of Patent: Jan. 3, 2012

(54) KNEADER

(75) Inventors: Kazuhisa Fukutani, Kobe (JP); Sayaka Yamada, Kobe (JP); Shigehiro Kasai, Takasago (JP); Kazuo Yamaguchi, Takasago (JP); Yasuaki Yamane, Takasago (JP)

(73) Assignee: Kobe Steel, Ltd., Hyogo (JP)

( * ) Notice: Subject to any disclaimer, the term of this patent is extended or adjusted under 35 U.S.C. 154(b) by 691 days.

(21) Appl. No.: 12/232,368

(22) Filed: Sep. 16, 2008

(65) Prior Publication Data

US 2009/0097350 A1    Apr. 16, 2009

(30) Foreign Application Priority Data

Oct. 15, 2007   (JP) .................................. 2007-267907

(51) Int. Cl.
*A21C 1/06* (2006.01)
(52) U.S. Cl. ............................. 366/83; 366/85; 366/301
(58) Field of Classification Search .................... 366/83, 366/85, 301
See application file for complete search history.

(56) References Cited

FOREIGN PATENT DOCUMENTS

| | | |
|---|---|---|
| CN | 1046116 A | 10/1990 |
| EP | 0 662 444 A2 | 7/1995 |
| JP | 56-158135 | 12/1981 |
| JP | 09-085739 | 9/1995 |
| JP | 2004-262177 | 3/2003 |
| JP | 2006-056095 | 3/2006 |

OTHER PUBLICATIONS

The First Office Action issued by the State Intellectual Property Office of People's Republic of China on Mar. 16, 2011 in the corresponding Chinese Application No. 200810214425.7 (4 pages) with an English language translation (3 pages).
Office Action from Japanese Patent Office in the corresponding Japanese Application No. 2007-267907, mailed Mar. 9, 2010, in Japanese and English.

*Primary Examiner* — Joseph Del Sole
*Assistant Examiner* — James Sanders
(74) *Attorney, Agent, or Firm* — Stites & Harbison PLLC; Juan Carlos A. Marquez, Esq.

(57) ABSTRACT

One object of the present invention is to provide a kneader which can diminish wear of screws and a barrel while preventing the manufacturing process for the screws and barrel from becoming complicated. In this kneader, a pair of screws are rotated about respective axes thereof to knead a material to be kneaded which is introduced into a kneading space formed within a barrel. Each screw has such a shape generating deflection in a predetermined direction perpendicular to an arranged direction of the axes of the pair of screws during kneading of the material to be kneaded, and the kneading space has a shape such that a pair of accommodating spaces which accommodate each of the screws respectively are connected together so as to overlap each other partially in the radial direction, each accommodating space being formed in such a manner that the diameter thereof in the predetermined direction in which there occurs deflection of each screw is larger than in any other direction.

18 Claims, 9 Drawing Sheets

KNEADER

BACKGROUND OF THE INVENTION

1. Field of the Invention

The present invention relates to a kneader for kneading a material to be kneaded such as resin.

2. Description of the Related Art

Heretofore there has been known a twin-screw extrusion type kneader for kneading a material to be kneaded such as resin. Such a kneader includes a pair of screws disposed in parallel with each other and a barrel having in the interior thereof a kneading space for accommodating both screws. The kneading space of the barrel has a shape such that a pair of accommodating spaces of a substantially circular section for accommodating each of the screws respectively are connected together so as to overlap each other partially in a radial direction. In this conventional kneader, the pair of screws are each rotated about the axis thereof, and thereby a material to be kneaded which is introduced into the kneading space is kneaded by utilizing a shear force developed between both screws and also between each screw and an inner wall surface of the barrel.

In such a kneader, each screw undergoes pressure from the material to be kneaded during kneading of the material. This pressure sometimes results in a case where each screw undergoes an unbalanced load in a specific direction orthogonal to an axial direction of the screws and causes a deflection. Once there occurs such a deflection of each screw, there is a fear that the outermost periphery portion of each screw may contact the inner wall surface of the barrel, with consequent wear of both screw and barrel. Thus, there arise the problem that the life of each screw and that of the barrel become shorter due to such wear and the problem that metal powders resulting from the wear are mixed as foreign matters into the material being kneaded, resulting in the quality of the material being deteriorated.

Techniques for solving the above-mentioned problems are proposed in the following Patent Literatures 1 and 2.

In Patent Literature 1 there is disclosed a technique of forming a screw in a shape such that the angle of a front face in a rotational direction of the screw is set smaller than in an ordinary type of a screw, thereby making the pressure which the screw undergoes from a material to be kneaded difficult to increase and thereby diminishing deflection of the screw caused the above pressure. According to this technique, the wear induced by contact of the screw with the inner wall surface of the barrel is diminished.

In Patent Literature 2 there is disclosed a technique of applying a surface treatment to the surface of each screw and an inner wall surface of a barrel to improve wear resistance of those surfaces, thereby diminishing wear induced by contact of the screw with the inner wall surface of the barrel.

[Patent Literatures]

1. Japanese Patent Laid-Open Publication No. 2004-262177
2. Japanese Patent Laid-Open Publication No. Hei 9 (1997)-85739

SUMMARY OF THE INVENTION

However, the technique disclosed in Patent Literature 1 involves the problem that a three-dimensional shape of the screw is very complicated and the machining of the screw becomes complicated.

Likewise, the technique disclosed in Patent Literature 2 involves the problem that such an additional complicated process of applying a surface treatment to the surface of each screw and the inner wall surface of the barrel is needed and the screws and barrel manufacturing process becomes complicated.

The present invention has been accomplished for solving the above-mentioned problems and it is an object of the invention to provide a kneader capable of diminishing wear of both screws and barrel while preventing the screws and barrel manufacturing process from becoming complicated.

According to the present invention, in order to achieve the above-mentioned object, there is provided a kneader comprising a pair of screws disposed in parallel with each other, a barrel having a kneading space for accommodating the pair of screws in the interior thereof, and a drive unit for rotating the pair of screws about respective axes thereof, the kneader kneading a material to be kneaded introduced into the kneading space by rotating the screws about the respective axes thereof, wherein each of the screws has a shape generating deflection in a specific direction orthogonal to the axis thereof during kneading of the material to be kneaded, and the kneading space has a shape such that a pair of accommodating spaces for accommodating the screws respectively are connected together so as to overlap each other partially in a radial direction, each of the accommodating spaces including a larger-diameter portion in at least a portion in the axial direction of the screws, the larger-diameter portion being formed in such a manner that a diameter thereof in the specific direction is larger than any other direction.

Thus, in this kneader, the accommodating spaces which constitute the kneading space within the barrel each include a larger-diameter portion, the larger-diameter portion having a diameter larger in the specific direction in which screw deflection occurs than in any other direction, so even if screw deflection occurs in the specific direction during kneading of the material to be kneaded, the contact between each screw and an inner wall surface of the barrel can be diminished by the larger-diameter portion and hence it is possible to diminish wear between each screw and the barrel.

If the diameter of each accommodating space is set large, acting force applied to the material to be kneaded becomes smaller when kneading the material by rotating the screw in each accommodating space and there is a fear that the kneading of the material may become insufficient. However, in the kneader of the present invention, only the diameter in the specific direction in which screw deflection occurs is set larger than in any other direction in the larger-diameter portion of each accommodating space. Consequently, in comparison with the case of a larger diameter around the whole circumference of each accommodating space, it is possible to suppress a lowering of the acting force applied to the material to be kneaded in the kneading process and hence possible to knead the material to a thorough extent.

Moreover, in the above kneader of the present invention, unlike the conventional case where each screw is formed in such a shape suppressing an increase of pressure which is imposed on the screw from the material to be kneaded, a three-dimensional shape of each screw need not be machined into a complicated shape and therefore it is possible to prevent the machining of each screw from becoming complicated.

Further, in the above kneader of the present invention, unlike the conventional case where a surface treatment for improving wear resistance is applied to both the surface of each screw and an inner wall surface of the barrel, it is possible to prevent the addition of a complicated surface treatment process and hence possible to prevent the screws and barrel manufacturing process from becoming complicated. Thus, according to the kneader of the present invention it is possible to diminish wear of the screws and barrel and knead the material to be kneaded to a thorough extent while preventing the screws and barrel manufacturing process from becoming complicated.

In the above kneader of the present invention, preferably, each of the screws has a shape generating deflection in a predetermined direction perpendicular to an arranged direction of the axes of the pair of screws during kneading of the material to be kneaded, and the larger-diameter portion has a larger diameter in the specific direction in which each of the screws generates deflection than any other direction.

According to this construction, even when each screw is deflected in a direction perpendicular to the arranged direction of the axes of the paired screws during kneading of the material to be kneaded, it is possible to effectively diminish contact between each screw and the inner wall surface of the barrel because the larger-diameter portion of each accommodating space has a diameter larger in that direction than in any other direction.

According to a more concrete construction in this connection which may be adopted, the pair of screws are formed equal in shape and are arranged in such a manner that rotating paths of the respective outermost periphery portions intersect each other during rotation, further, the drive unit causes the pair of screws to rotate in the same direction while maintaining such a phase difference as prevents mutual interference of the screws.

In the above kneader of the present invention, preferably, the inner wall surface of the barrel which surrounds the larger-diameter portions has a plane portion extending in the aforesaid predetermined direction in which there occurs deflection of each screw, and a ratio L/C is in the range of 1 to 4, wherein L is the length of the plane portion in the predetermined direction, C is a clearance between the outermost periphery portion of the screws and the plane portion of the inner wall surface of the barrel which surrounds the larger-diameter portion with the screws accommodated therein.

As a result of an earnest study made by the present inventors it became clear that if the length L of the plane portion of the barrel inner wall surface which surrounds the larger-diameter potions was set as to give the ratio L/C of 1 or more, not only the pressure exerted on each screw from the material to be kneaded could be reduced to an effective range, but also the deflection of each screw could be diminished, and also the contact between each screw and the inner wall surface of the barrel segment could be diminished. The larger the length L of the plane portion becomes, that is, the larger the ratio L/C, the larger the diameter of the larger-diameter portion in the aforesaid specific direction and it is possible to diminish contact between each screw and the inner wall surface of the barrel. In this case, however, there is a fear of excessive lowering of the acting force applied to the material to be kneaded, resulting in insufficient kneading of the material to be kneaded. Having made an earnest study in view of this point, the present inventors found out that sufficient kneading of the material to be kneaded could be attained if the length L of the plane portion is set at such a value as affording the L/C ratio of 4 or less. Thus, as in the construction being considered, if the ratio L/C is set at a value of 1 to 4, it is possible to attain both diminishing of the contact between each screw and the barrel inner wall surface and sufficient kneading of the material to be kneaded at a same time.

In the above kneader, preferably, each of the screws has a plurality of kneading sections separately disposed in the axis direction thereof for kneading the material to be kneaded, the barrel has an inlet port for introducing the material to be kneaded into the kneading space formed in the interior thereof, and the larger-diameter portion is formed so as to accommodate at least one of the kneading sections disposed closest to the inlet port out of the plurality of kneading sections.

After being introduced from the inlet port, the material to be kneaded is kneaded while being melted with heat generated during kneading and is fed to a downstream side with rotation of the screws. In the kneading section disposed closest to the inlet port out of the plural kneading sections there is kneaded the material which contains much a material portion not melted yet, so that the screw undergoes a higher pressure from the material to be kneaded in that kneading section than in the kneading section disposed on the downstream side. Consequently, in the kneading section disposed closest to the inlet port, large deflection is apt to occur during kneading of the material to be kneaded. In this construction, however, since the larger-diameter portion is provided so as to accommodate the kneading section which is apt to generate large deflection, it is possible to effectively diminish contact between that kneading section and the barrel inner wall surface which is attributable to large deflection in the kneading section disposed closest to the inlet port.

In the above kneader, preferably, the barrel includes plural barrel segments which are connected together in the axial direction of the barrel to form the foregoing kneading space and at least one of the barrel segments has the larger-diameter portion.

With such a construction, the larger-diameter portion can be disposed at an arbitrary position in the axial direction of the barrel by changing the position of the barrel segment having the larger-diameter portion as necessary, the position of the larger-diameter portion can be changed easily to match a large deflection-generating portion of each screw in comparison with the case where the barrel is constituted by a single member which is continuous in the axial direction of the barrel. In this construction, if only a selected barrel segment or segments has/have the larger-diameter portion out of plural barrel segments, it is possible to reduce the number of barrel segments having the larger-diameter portion the machining of which is troublesome, in comparison with the construction wherein all barrel segments have the larger-diameter portion.

In this case, preferably, each of the screws has a plurality of kneading sections separately disposed in the axis direction thereof for kneading the material to be kneaded, the barrel has an inlet port for introducing the material to be kneaded into the kneading space formed in the interior thereof, and one of the plurality of barrel segments which accommodates one of the kneading sections disposed closest to the inlet port has the larger-diameter portion.

According to such a construction, like the construction wherein the larger-diameter portion is provided so as to accommodate at least the kneading section disposed closest to the inlet port out of plural kneading sections, it is possible to reduce the number of barrel segments having the larger-diameter portion the machining of which is troublesome out of plural barrel segments while effectively diminishing a contact between the kneading section and the barrel inner wall surface which is attributable to large deflection in the kneading section disposed closest to the inlet port.

According to the present invention, as described above, it is possible to diminish wear of screws and a barrel while preventing the screws and barrel manufacturing process from becoming complicated.

BRIEF DESCRIPTION OF THE DRAWINGS

FIG. 9 is a correlation diagram showing a relation between the ratio L/C and a ratio of average torque T/T0 of each screw 4, wherein.

DESCRIPTION OF THE PREFERRED EMBODIMENTS

Embodiments of the present invention will be described hereinunder with reference to the accompanying drawings.

Figure 1:
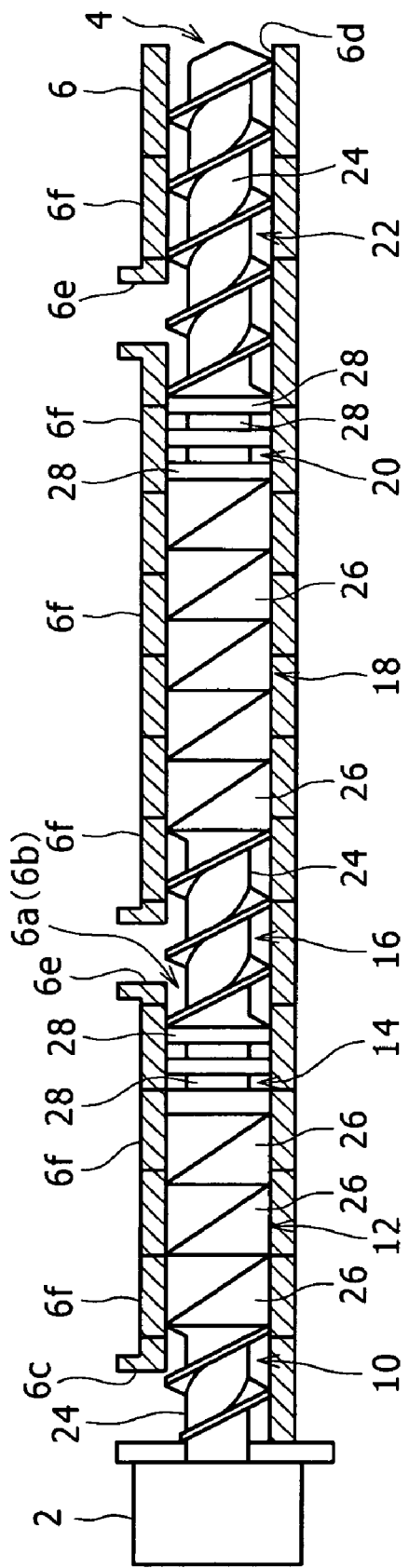
FIG. 1 is a longitudinal sectional view of a kneader according to an embodiment of the present invention.
Figure 2:
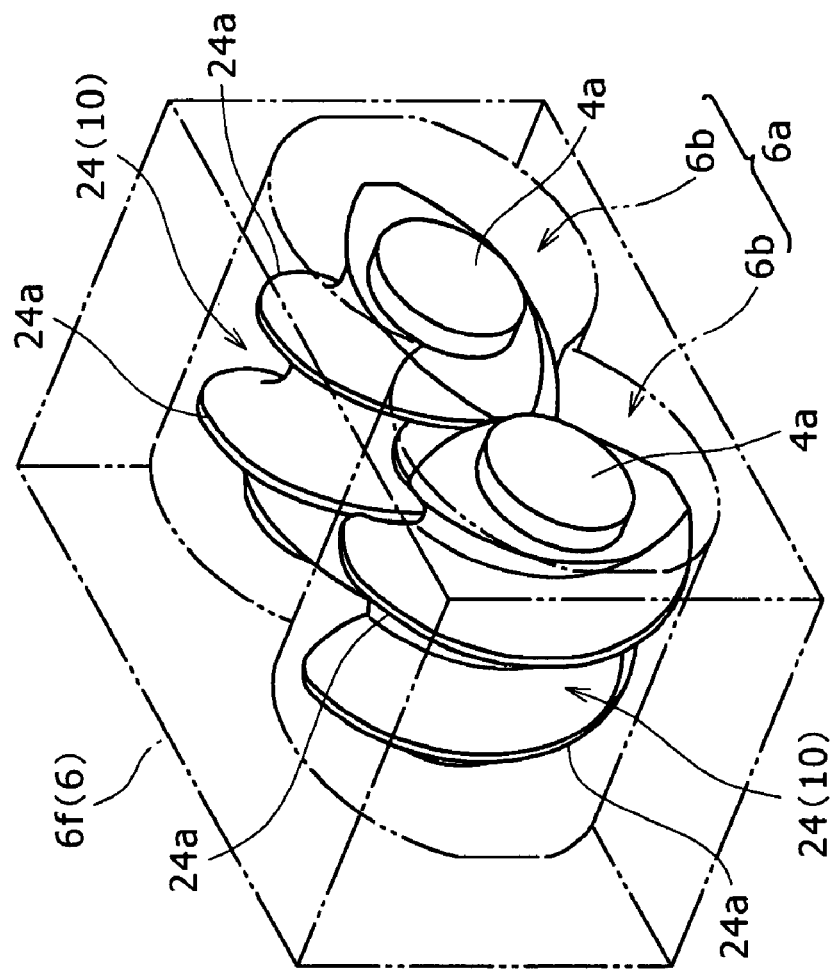
FIG. 2 is a perspective view showing full-flighted screws which constitute first to third conveying sections of screws in the kneader of FIG. 1.
Figure 3:
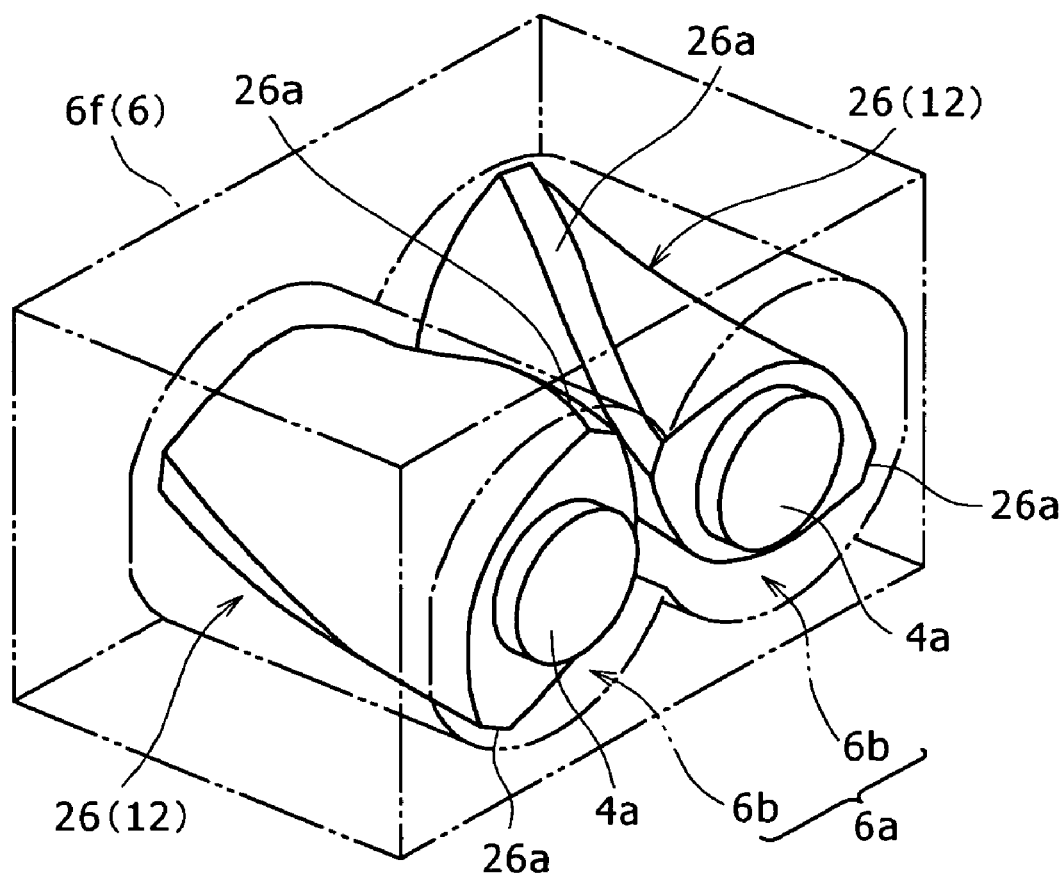
FIG. 3 is a perspective view showing rotors which constitute first and second kneading sections of the screws in the kneader of FIG. 1.
Figure 4:
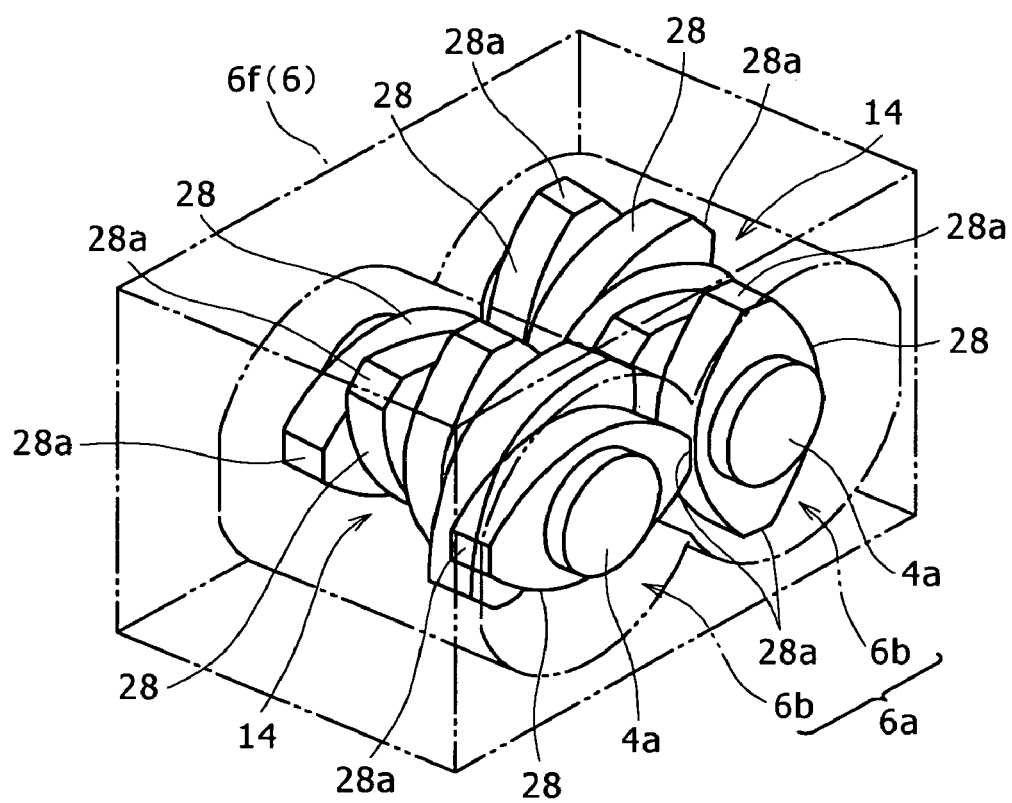
FIG. 4 is a perspective view showing kneading discs which constitute first and second conveyance resisting sections of the screws in the kneader of FIG. 1.
Figure 5:
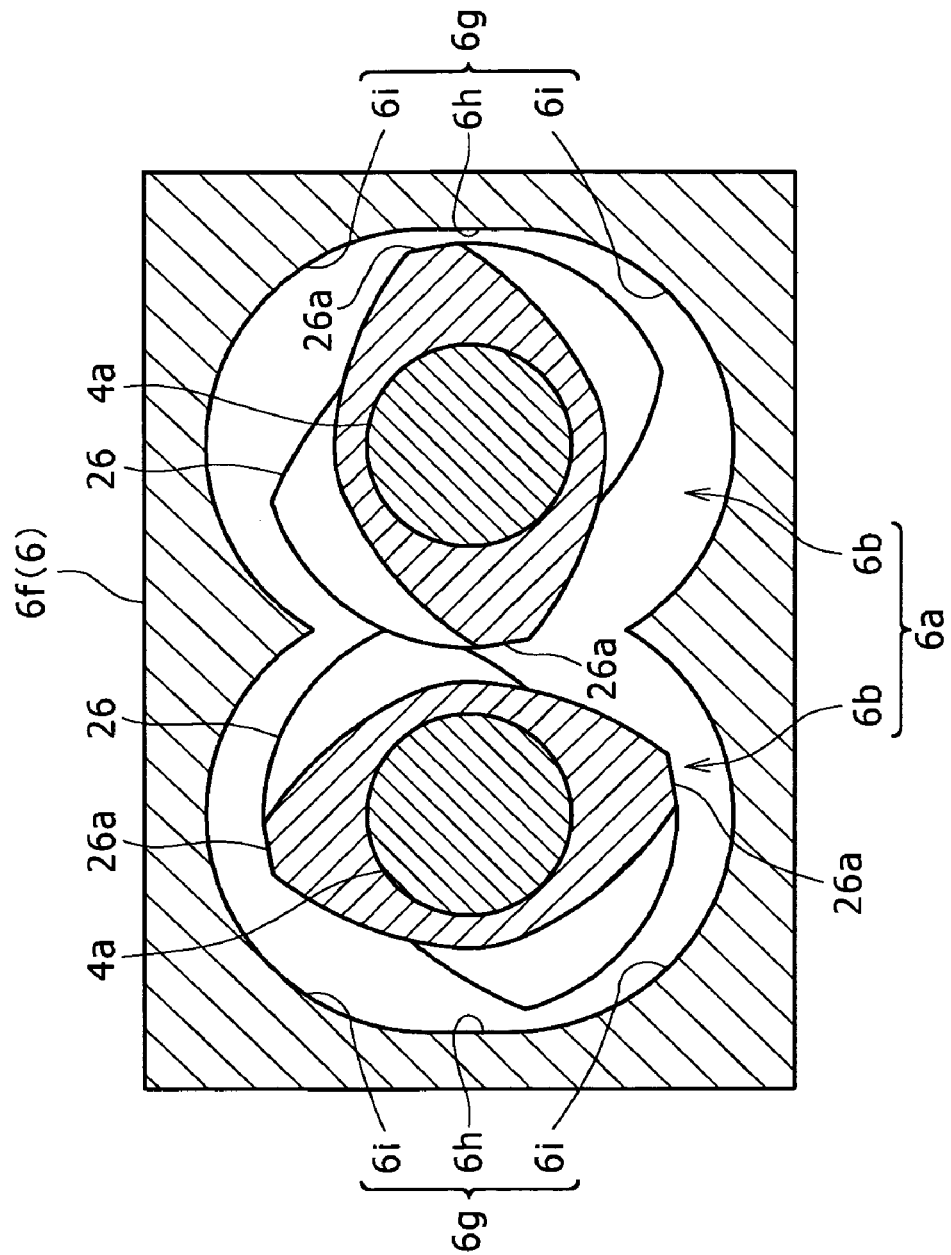
FIG. 5 is a sectional view showing the shape of the rotors of FIG. 3 and of a barrel which surrounds the rotors in a section perpendicular to an axial direction of the screws.
Figure 6:
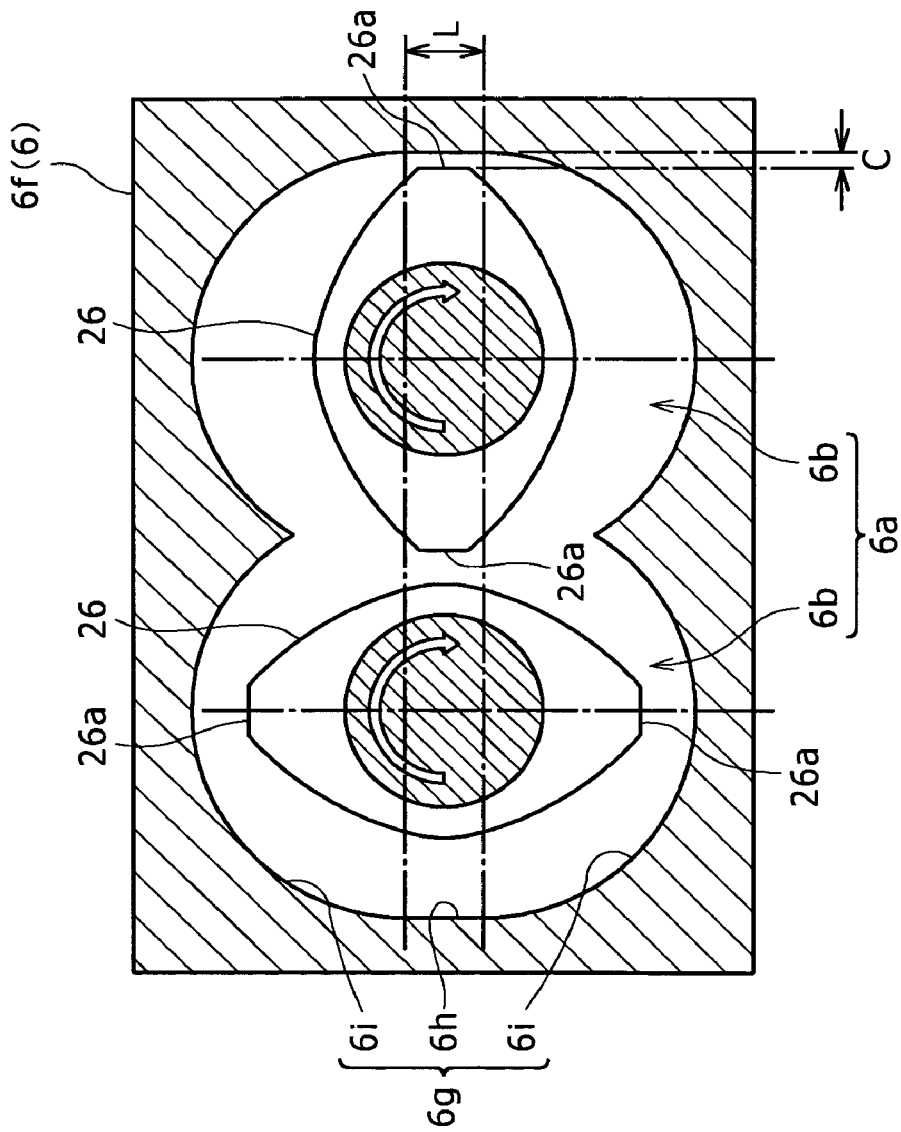
FIG. 6 is a sectional view for illustrating the shape of an inner wall surface of the barrel and a positional relation between the barrel inner wall surface and the screws.

FIG. 1 is a longitudinal sectional view of a kneader according to an embodiment of the present invention. FIG. 2 is a perspective view of full-flighted screws 24 which constitute first to third conveying sections 10, 16 and 22 of screws 4 in the kneader of FIG. 1. FIG. 3 is a perspective view showing rotors 26 which constitute first and second kneading sections 12, 18 of the screws 4 in the kneader of FIG. 1. FIG. 4 is a perspective view of kneading discs 28 which constitute first and second conveyance resisting sections 14, 20 of the screws 4 in the kneader of FIG. 1. FIG. 5 is a sectional view showing the shape of the rotors 26 of FIG. 3 and of a barrel segment 6f which surrounds the rotors 26 in a section perpendicular to an axial direction of the screws 4. FIG. 6 is a sectional view for illustrating the shape of an inner wall surface 6g of a barrel 6 and a positional relation between the inner wall surface 6g and the screws 4. First, with reference to FIGS. 1 to 6, a description will be given about the construction of a kneader according to an embodiment of the present invention.

The kneader according to the present embodiment is a twin-screw extrusion type kneader for kneading a material to be kneaded such as rubber or any of various kinds of resins while feeding the material downstream. The kneader includes a drive unit 2, a pair of screws 4, 4 and a barrel 6.

The drive unit 2 is connected to a base end side of the pair of screws 4, 4 to rotate each screw 4 about an axis thereof. The drive unit 2 causes the pair of screws 4, 4 to rotate in same direction at an equal rotational speed while maintaining a phase difference (90° in the present embodiment) to avoid mutual interference of the screws 4, 4.

The pair of screws 4, 4 are adapted to rotate about the respective axes thereof to knead the material to be kneaded while feeding the material downstream. Both screws 4, 4 are disposed so as to extend horizontally in parallel with each other. The screws 4 are disposed within each of accommodating spaces 6b, 6b respectively in a kneading space 6a to be described later which is formed within the barrel 6. As shown in FIG. 1, each screw 4 includes a first conveying section 10, a first kneading section 12, a first conveyance resisting section 14, a second conveying section 16, a second kneading section 18, a second conveyance resisting section 20 and a third conveying section 22. These sections are arranged in this order from the base end side toward a front end side of the screw 4.

The first conveying section 10 is a section for feeding the material to be kneaded downstream. The first conveying section 10 is constituted by such a full-flighted screw 24 as shown in FIG. 2. Each screw 4 extends in the axial direction thereof and is connected to the drive unit 2, further, it has a shaft 4a which is given rotation from the drive unit 2. The full-flighted screw 24 is fitted and fixed onto the shaft 4a and it has two helical blades 24a, 24a disposed at a phase of 180° with respect to each other.

The first conveying sections 10 of both screws 4, 4 are disposed in such a manner that rotating paths of their outermost periphery portions, namely, edges of the helical blades 24a in the radial direction, intersect each other during rotation, however since the first conveying sections 10 of both screws 4, 4 rotate while maintaining a phase difference between the two, mutual interference does not occur during rotation. With rotation of each screw 4, the first conveying section 10 of the screw 4 rotates about the screw axis in the same direction as the rotational direction of the screw. With this rotation, a powdered material to be kneaded, which is introduced into the kneading space 6a from an inlet port 6c to be described later of the barrel 6, is extruded downstream.

The first kneading section 12 is a section for feeding the material to be kneaded downstream while kneading the material after being fed from the first conveying section 10.

More specifically, the first kneading section 12 is constituted by plural such rotors 26 as shown in FIG. 3 which are connected together in the axial direction. The rotors 26 are fitted and fixed onto the shaft 4a. The rotors 26 in the first kneading section 12 have a sectional shape perpendicular to the axial direction like the full-flighted screw 24 in the first conveying section 10. A downstream-side end face of the first conveying section 10 and an upstream-side end face of the first kneading section 12 are overlapped together without misalignment.

Each of the rotors 26 in the first kneading section 12 has two helical blades 26a, 26a formed at a predetermined certain twisted angle. The helical blades 26a, 26a are disposed at a phase of 180° with respect to each other. The first kneading sections 12 of both screws 4, 4 are disposed in such a manner that rotating paths of the outermost periphery portions of the first kneading sections 12, namely, edges of the helical blades 26a in the radial direction, intersect each other during rotation. However, because first kneading sections 12 of both screws 4, 4 rotate while maintaining a phase difference between the two, mutual interference thereof is avoided during rotation.

With rotation of each screw 4, the first kneading section 12 of the screw 4 rotates in the same direction about the axis of the screw and feeds the powdered material to be kneaded which is fed from the first conveying section 10 downstream while kneading the material. Heat is generated during this kneading operation and the material to be kneaded is melted by the heat. The melted material is kneaded by the first kneading section 12. Therefore, the material kneaded in the first kneading section 12 contains a powdery portion not melted yet and the first kneading section 12 undergoes a high pressure from the material during this kneading operation.

The first conveyance resisting section 14 imposes conveyance resistance on the material to be kneaded while kneading the material which is fed from the first conveying section 10, thereby prolonging the kneading time in the first kneading section 12 located on the upstream side and allowing the material to be kneaded to a thorough extent in the first kneading section 12. The first conveyance resisting section 14 is constituted by plural such kneading discs 28 as shown in FIG. 4 which are connected together in the axial direction. The kneading discs 28 are each fitted and fixed onto the shaft 4a and each have a sectional shape perpendicular to the axial direction like the rotors 26 in the first kneading section 12. A downstream-side end face of the first kneading section 12 and an upstream-side end face of the first conveyance resisting section 14 are overlapped each other without misalignment.

The kneading discs 28 are each constituted in a plate shape having a small axial length. Each kneading disc 28 has two kneading blades 28a, 28a disposed at a phase of 180° with respect to each other and in parallel with the axis. The kneading discs 28 adjacent to each other in the axial direction are disposed with phase shifted at a predetermined angle about the axis. As a result, the sectional shape of the first conveyance resisting section 14 which is perpendicular to the axial direction varies discontinuously in the axial direction. Corresponding kneading discs 28 in the first conveyance resisting sections 14 of both screws 4, 4 are disposed in such a manner that rotating paths of the outermost periphery portions of the kneading discs 28, namely, edges of the kneading blades 28a in the radial direction, intersect each other during rotation. However because the first conveyance resisting sections 14 of both screws 4, 4 rotate while maintaining a phase difference between the two, mutual interference is avoided during rotation.

The second conveying section 16 is a section for feeding the material to be kneaded downstream after being fed from the first conveyance resisting section 14. The second conveying section 16 is constituted like the first conveying section 10.

The second kneading section 18 is a section for feeding the material to be kneaded downstream while kneading the material after being fed from the second conveying section 16 and it is constituted like the first kneading section 12. However, the material kneaded in the second kneading section 18 is already in a melted state and therefore the pressure imposed on the second kneading section from the material to be kneaded is low in comparison with the first kneading section 12 which kneads the material containing a powdery portion.

In the second conveyance resisting section 20, conveyance resistance is imposed on the material to be kneaded while the material fed from the second kneading section 18 is kneaded, thereby prolonging the kneading time in the second kneading section 18 located on the upstream side and allowing the material to be kneaded to a thorough extent in the second kneading section 18. The second conveyance resisting section 20 is constituted like the first conveyance resisting section 14.

The third conveying section 22 is a section for feeding the material to be kneaded downstream after being fed from the second conveyance resisting section 20 and discharging the material after kneading through an outlet port 6d to be described later of the barrel 6. The third conveying section 22 is constituted like the first conveying section 10.

The screws 4 constructed as above have a shape generating deflection in a direction perpendicular to the arranged direction of the axes of the pair of screws 4, 4, namely, in the vertical direction, when rotating about the axes to knead the material to be kneaded. This deflection is generated as a result of imposition of an unbalanced load on each screw 4 which is generated by the pressure received from the material to be kneaded during kneading. Since the first kneading section 12 of each screw 4 undergoes a high pressure from the material to be kneaded as noted above, the aforesaid deflection generated in the first kneading section 12 is large.

The barrel 6 has in the interior thereof a kneading space 6a for kneading the material to be kneaded under rotation of the pair of screws 4, 4. The kneading space 6a of the barrel 6 is made up of a pair of accommodating spaces 6b, 6b which accommodate each of the screws 4 respectively. The accommodating spaces 6b, 6b have a shape such that both spaces 6b, 6b are connected together so as to overlap each other partially in the radial direction. The accommodating spaces 6b extend in the axial direction of the screws 4. In an upper portion on one axial end side of the barrel 6, in other words, in an upper position of the portion corresponding to the first conveying sections 10 of the screws 4, there is formed an inlet port 6c for introducing the material to be kneaded into the kneading space 6a, while on the other end side of the barrel there is formed an outlet port 6d for discharge of the material after kneading. Further, apertures 6e for deaeration and observation are formed in plural axial positions of the barrel 6.

Each accommodating space 6b has a larger diameter in the vertical direction in which the screw 4 generates deflection while kneading the material to be kneaded than any other direction. That is, in the present embodiment, the whole in the axial direction of each accommodating section 6b is the associated large-diameter portion defined in the present invention. Consequently, when each screw 4 generates deflection during kneading of the material to be kneaded, the contact between the screw 4 and an inner wall surface 6g of the barrel 6 is diminished.

More specifically, as shown in FIG. 5, the inner wall surface 6g of the barrel 6 which surrounds each accommodating space 6b is made up of a plane portion 6h extending in the vertical direction in which each screw 4 generates deflection and circular-arc curved portions 6i, 6i being connected with upper and lower portions of the plane portion 6h. In the presence of the plane portion 6h the diameter of the accommodating space 6b is enlarged in the vertical direction in which there occurs deflection of each screw 4, and the diameter of the accommodating space 6b in that direction is larger than the diameter in any other direction. In the present embodiment, L and C are set so that the ratio of L/C is in the range of 1 to 4, wherein L is the length of the plane portion 6h in the vertical direction in which there occurs deflection of each screw 4 (see FIG. 6), and C is a clearance between the outermost diameter portion of the screw 4 and the plane portion 6h of the inner wall surface 6g of the barrel 6 which surrounds the accommodating space 6b with the screw 4 accommodated therein (see FIG. 6).

The barrel 6 is made up of plural barrel segments 6f which are connected together in the axial direction to form the kneading space 6a. That is, each segment 6f has in the interior thereof a portion in the axial direction of the kneading space 6a comprised of the accommodating spaces 6b, 6b.

Next, a description will be given below about the operation which the kneader of the present embodiment performs for kneading the material to be kneaded.

First, each of the screws 4, 4 is rotated in the same direction about respective axes thereof at an equal speed by the driving unit 2. Thereafter, a powdered material to be kneaded is introduced into the kneading space 6a within the barrel 6 through the inlet port 6c of the barrel 6. The material to be kneaded is introduced into the space corresponding to the first conveying section 10 of both screws 4, 4. The first conveying sections 10 of both screws 4, 4 rotate and thereby feed the material to be kneaded to the first kneading sections 12 located on the downstream side.

The first kneading sections 12 feed the fed powdered material to the first conveyance resisting sections 14 located on the downstream side while kneading the material. Heat is generated in the kneading operation performed by the first kneading sections 12 and the material to be kneaded is further kneaded while being melted with the heat. In the first kneading sections 12, the material is kneaded in the powdered state until it melts, so that the first kneading sections undergo a high pressure from the material. An unbalanced load attributable to the high pressure is imposed on the first kneading sections 12, thus causing deflection of each screw 4.

The first conveyance resisting sections 14 feed the material fed from the first kneading sections 12 to the second conveying sections 16 located on the downstream side while kneading the material. In the first conveyance resisting sections 14, since a large conveyance resistance is imposed on the material to be kneaded, the material feeding speed from the first conveyance resisting sections 14 to the downstream side becomes lower. Consequently, the kneading time in the first kneading sections 12 located on the upstream side becomes longer and the kneading of the material to be kneaded is done to a thorough extent in the first kneading sections 12.

Like the first conveying sections 10, the second conveying sections 16 feed the material to be kneaded, which is fed from the first conveyance resisting sections 14, to the second kneading sections 18 located on the downstream side.

Like the first kneading sections 12, the second kneading sections 18 knead the fed material and feed it to the second conveyance resisting sections 20 located on the downstream side. Since the material fed to the second kneading sections 18 is already in a melted state, the pressure which the second kneading sections 18 receive from the material to be kneaded is lower than the pressure which the first kneading sections 12 receive from the material.

Like the first conveyance resisting sections 14, the second conveyance resisting sections 20 feed the material to be kneaded to the third conveying sections 22 located on the downstream side while kneading the material after being fed from the second kneading sections 18. At this time, like the first conveyance resisting sections 14, the second conveyance resisting sections 20 impose a large conveyance resistance to the material to be kneaded, thereby prolonging the kneading time in the second kneading sections 18 located on the upstream side and allowing the kneading of the material to be done to a thorough extent in the second kneading sections 18.

Like the first conveying sections 10, the third conveying sections 22 feed the kneaded material to the downstream side after being fed from the second conveyance resisting sections 20 and discharge it to the exterior from the outlet port 6d of the barrel 6. In this way the material to be kneaded is kneaded by the kneader of the present embodiment.

In the above material kneading process, an unbalanced load attributable to the pressure from the material to be kneaded is imposed on each screw 4 and deflection occurs in each screw 4 due to the unbalanced load. Particularly, the first kneading sections 12 undergo a high pressure and large deflection occurs because the material kneaded therein contains much powdery portion.

Figure 7:
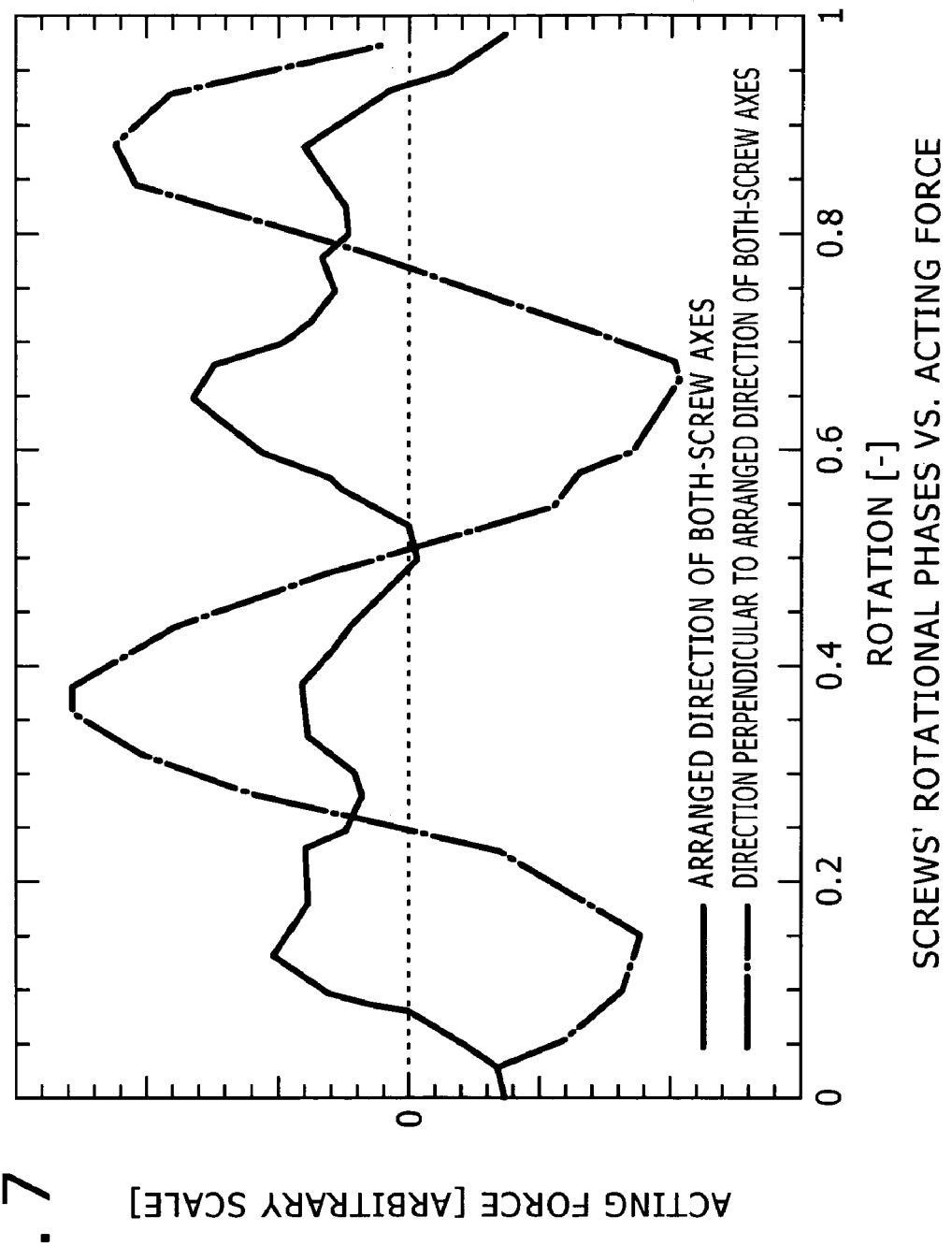
FIG. 7 is a correlation diagram showing a relation of a rotational phase of each screw to an acting force which each screw undergoes in an arranged direction of axes of a pair of screws and an acting force which each screw undergoes in a direction perpendicular to the arranged direction of the axes of the screws.

FIG. 7 shows the results of having analyzed acting force which each screw undergoes in the arranged direction of the axes of both screws 4, 4 and acting force which each screw 4 undergoes in a direction (vertical direction) perpendicular to the arranged direction of the axes while varying the rotational phase of each screw 4.

From the results of FIG. 7 it is seen that each screw undergoes a higher pressure from the material to be kneaded in the direction (vertical direction) perpendicular to the arranged direction of the axes of both screws 4, 4 as compared with the arranged direction of the axes thereof and that deflection is apt to occur in that direction (vertical direction). Such deflection of each screw causes contact between the screw 4 and the inner wall surface 6g of the barrel 6.

In the present embodiment, as described above, the accommodating spaces 6b in the barrel 6 are each formed so as to have a diameter larger in the vertical direction in which the screw 4 accommodated therein generates deflection than in any other direction, thereby diminishing contact between the screw 4 and the inner wall surface 6g of the barrel 6 which is caused by the aforesaid deflection of the screw 4.

Further, the inner wall surface 6g of the barrel 6 is formed so that the ratio of L/C is in the range of 1 to 4 wherein L is the length of the plane portion 6h in the vertical direction in which each screw 4 generates deflection (see FIG. 6), and C is the clearance between the outermost periphery portion of each screw 4 and the inner wall surface 6g of the barrel 6 (see FIG. 6). As a result, both decrease of the contact between each screw 4 and the inner wall surface 6g of the barrel 6 and thorough kneading of the material to be kneaded are attained at a time.

Figure 8:
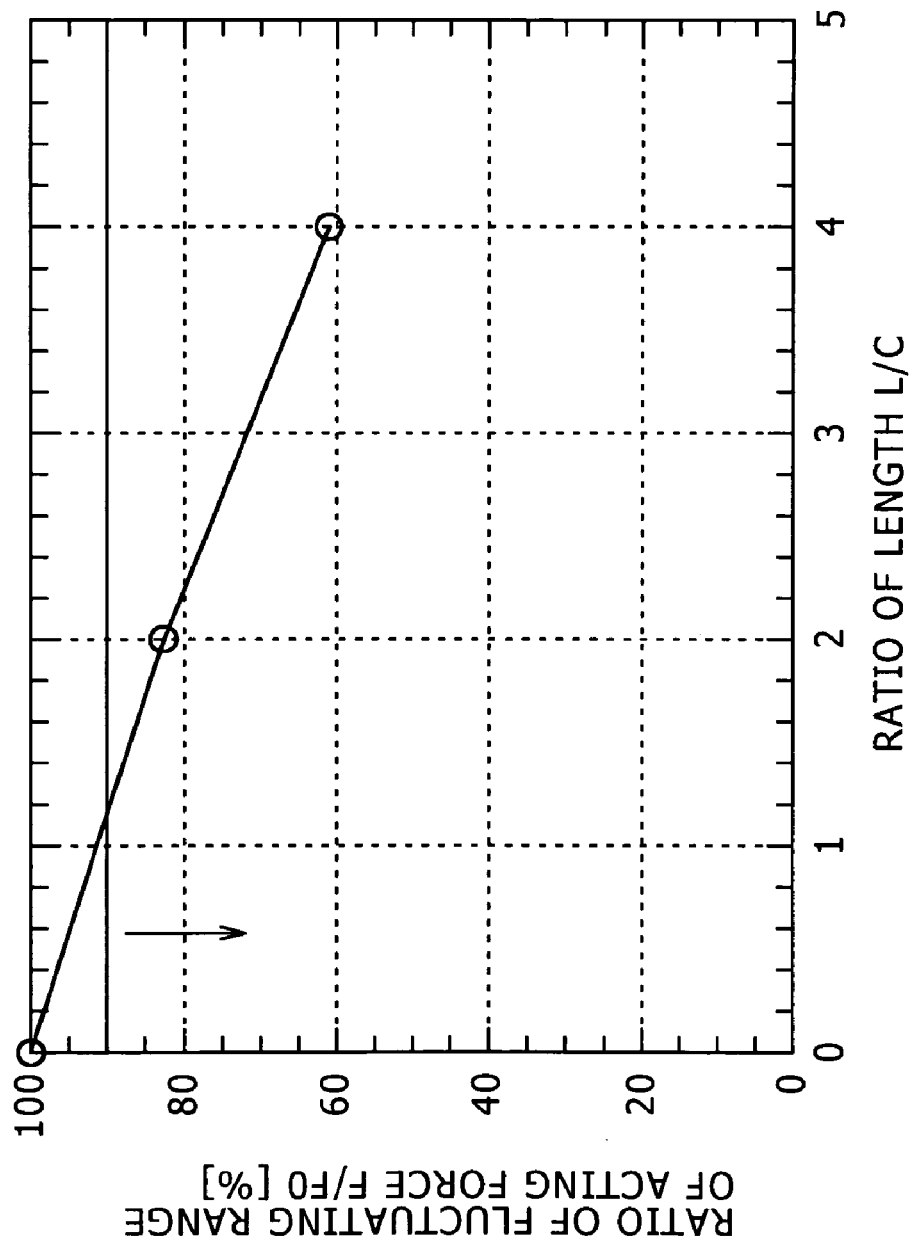
FIG. 8 is a correlation diagram showing a relation between a ratio L/C and a ratio F/F0, wherein L is the length of a plane portion of the barrel inner wall surface in a direction perpendicular to the arranged direction of the axes of the pair of screws, C is a clearance between the outermost periphery portion of each screw and the plane portion of the inner wall surface of the barrel which surrounds an accommodating space accommodating that screw, and ratio F/F0 is a ratio of fluctuating range of acting force which each screw undergoes from a material to be kneaded.
Figure 9:
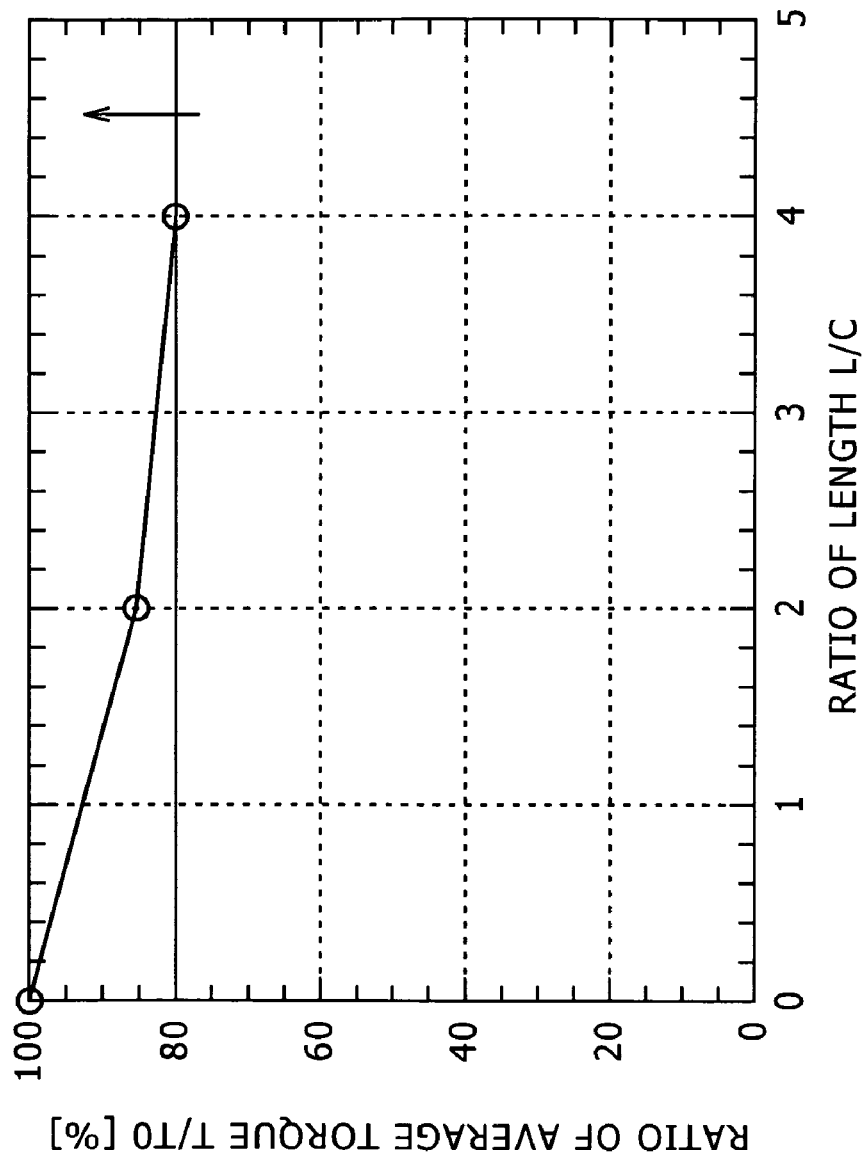

FIG. 8 shows the results of having measured acting force which the screws 4 receive from the material to be kneaded under varying values of the L/C and FIG. 9 shows the results of having measured an average torque of the screws 4 under varying values of the L/C. In FIG. 8, a ratio of fluctuating range of acting force F/F0 is a ratio of an acting force F which each screw 4 receives at each of various values of the ratio L/C to an acting force F0, assuming that the acting force F0 is 100%, the acting force F0 being an acting force which each screw 4 receives from the material to be kneaded when the ratio L/C is 0, that is, when the length L of the plane portion 6h is 0. In FIG. 9, a ratio of average torque T/T0 represents a ratio of torque T of each screw 4 at each of various values of the ratio L/C to torque T0, assuming that the torque T0 is 100%, the torque T0 being a torque when the ratio L/C is 0, that is, when the length L of the plane portion 6h is 0.

From the results of FIG. 8 it is seen that the larger the value of the ratio L/C, that is, the larger the length L of the plane portion 6h, the lower the acting force which each screw 4 receives from the material to be kneaded. This is presumed to be because the diameter of the accommodating space 6b in the vertical direction in which each screw 4 generates the deflection, becomes larger with an increase in length L of the plane portion 6h and the pressure exerted on each screw 4 from the material to be kneaded becomes lower. It is also seen that if the ratio L/C is set at 1 or more, the acting force exerted on each screw 4 from the material to be kneaded can be decreased to about 90% or less of the acting force F0 exerted on each screw when the length L of the plane portion 6h is 0, that is, when the accommodating space 6b has a circular-arc section of a uniform diameter.

Thus, it became clear that by setting the ratio L/C at 1 or more, the acting force exerted on each screw 4 from the material to be kneaded could be decreased effectively and that the deflection of each screw 4 attributable to that acting force could be diminished effectively, and the contact between each screw 4 and the inner wall surface 6g of the barrel 6 attributable to the deflection of the screw could also be diminished.

On the other hand, from the results of FIG. 9 it is seen that the torque of each screw 4 decreases as the value of the ratio L/C becomes larger, that is, as the length L of the plane portion 6h becomes larger. This is presumed to be because the pressure exerted on each screw 4 from the material to be kneaded lowers as the length L of the plane portion 6h becomes larger, and the torque of the screw 4 consequently decreases.

There is a correlation between the torque of the screw 4 and the degree of kneading of the material to be kneaded. More particularly, when the torque of the screw 4 is large, the pressure applied to the material to be kneaded is high and the kneading of the material is performed to a thorough extent, while when torque of the screw 4 is small, the pressure applied to the material to be kneaded is low and there is a fear of deficient kneading of the material to be kneaded. The foregoing results of FIG. 8 revealed that by making the length L of the plane portion 6h large it was possible to suppress the deflection of each screw 4 and diminish contact between each screw 4 and the inner wall surface 6g of the barrel 6. On the hand, from the results of FIG. 9 it is seen that by making the length L of the plane portion 6h large the pressure applied to the material to be kneaded becomes too low with a consequent fear of deficient kneading of the material to be kneaded.

From FIG. 9 it is seen that if the ratio L/C is set at 4 or less, the torque of each screw 4 can be maintained at about 80% or more of the torque T0 of the screw 4 obtained when the length L of the plane portion 6h is 0, that is, when the accommodating space 6b has a circular-arc section of a uniform diameter. Thus, it became clear that by setting the ratio L/C at 4 or less it was possible to keep the decrease of the pressure applied to the material to be kneaded within an effective range and effect thorough kneading of the material to be kneaded.

It follows that if the ratio L/C is set at a value of 1 to 4, it is possible to attain both decrease of the contact between each screw 4 and the inner wall surface 6g of the barrel 6 and thorough kneading of the material to be kneaded.

In the present embodiment, as described above, the accommodating spaces 6b which constitute the kneading space 6a within the barrel 6 each have a diameter larger in the vertical direction in which each screw 4 generates deflection than in any other direction, so even if there occurs deflection of each screw 4 during kneading of the material to be kneaded, it is possible to diminish contact between the screw and the inner wall surface 6g of the barrel 6, whereby it is possible to diminish wear of both screw 4 and barrel 6.

In the present embodiment, in each accommodating space 6b of the barrel 6, only the diameter in the vertical direction in which the screw 4 accommodated therein generates deflection is larger than in any other direction, therefore, in comparison with the case where the diameter of the accommodating space 6b is made large throughout the whole circumference of the space 6b, it is possible to suppress a lowering of the acting force applied to the material to be kneaded during kneading and hence possible to knead the material to a thorough extent.

In the present embodiment, unlike the conventional case where the screws are formed in a shape such that the pressure exerted thereon from the material to be kneaded is difficult to increase, a three-dimensional shape of each screw 4 need not be machined into a complicated shape and therefore the machining of the screw 4 can be prevented from becoming complicated.

In the present embodiment, unlike the conventional case where a surface treatment is applied to the surfaces of screws and also to the inner wall surface of the barrel to improve the wear resistance, it is possible to avoid using additional complicated surface treatment processes and hence possible to prevent the manufacturing process for the screws 4 and barrel 6 from becoming complicated. Therefore, according to the present embodiment it is possible to diminish wear of the screws 4 and barrel 6 and the material to be kneaded can be kneaded to a thorough extent while preventing the manufacturing process for the screws 4 and barrel 6 from becoming complicated.

In the present embodiment, the inner wall surface 6g of the barrel 6 which surrounds each accommodating space 6b has the plane portion 6h extending in the vertical direction in which there occurs deflection of the screw 4 accommodated therein, and the ratio L/C of the length L of the plane portion 6h in the vertical direction in which there occurs deflection of the screw 4 to the clearance C between the outermost periphery portion of each screw 4 and the plane portion 6h of the inner wall surface 6g of the barrel 6 which surrounds the accommodating space 6b with the screw 4 accommodated therein is set at a value in the range of between 1 and 4. By setting the length L of the plane portion 6h so as to give the ratio L/C of 1 or more, not only the pressure which each screw 4 receives from the material to be kneaded can be reduced to an effective range but also it is possible to diminish deflection of each screw 4 and hence possible to diminish contact between each screw 4 and the inner wall surface 6g of the barrel 6. On the other hand, by setting the length L of the plane portion 6h so as to give the ratio L/C of 4 or less there is attained thorough kneading of the material to be kneaded. Thus, in the present embodiment, both diminishing of contact between each screw 4 and the inner wall surface 6g of the barrel 6 and thorough kneading of the material to be kneaded can be attained at a time.

In the present embodiment, the accommodating space 6b in the barrel segment 6f which accommodates the first kneading section 12 close to the inlet port 6c of the barrel 6 out of the first and second kneading sections 12, 18 has a diameter larger in the vertical direction in which there occurs deflection of the screw 4 accommodated therein than in any other direction. Since the material kneaded in the first kneading section 12 contains much unmelted portion, the first kneading section 12 undergoes a higher pressure from the material to be kneaded than the second kneading section 18 and large deflection is apt to occur. In the present embodiment, however, since the accommodating space 6b in the barrel segment 6f which accommodates the first kneading section 12 has a diameter larger in the deflection occurring direction of the first kneading section 12 than in any other direction, it is possible to effectively diminish contact between the first kneading section 12 and the inner wall surface 6g of the barrel 6 which is attributable to the large deflection of the first kneading section 12.

The embodiment described above should be considered to be illustrative and not limitative in all points. The scope of the present invention is represented not by the above description of the embodiment but by the scope of claims. Further, all changes within the meaning and scope equivalent to the scope of claims are included in the scope of the present invention.

For example, although in the above embodiment both screws 4, 4 rotate in the same direction about their axes, the present invention is also applicable to the case where the screws 4 rotate in directions opposite to each other.

The rotors 26 which constitute the first and second kneading sections 12, 18 of each screw 4 are not limited to those each having two helical blades 26a, but may be those each having three helical blades.

The shape of the inner wall surface 6g of each barrel segment 6f is not limited to the one composed of the plane portion 6h and the pair of curved portions 6i. The shape of the inner wall surface 6g of each barrel segment 6f may be any other shape than the shape composed of the plane portion 6h and the curved portions 6i insofar as the shape adopted is such that the diameter of each accommodating space 6b in the deflection occurring direction of the screw 4 accommodated therein during kneading of the material to be kneaded is larger in any other direction.

For example, the inner wall surface 6g may be constituted in such a manner that the plane portion 6h is replaced with a curved portion and the accommodating space 6b becomes an elliptic space having a major diameter in the vertical direction in which there occurs deflection of the screw 4 accommodated therein. In the case where the direction in which each screw 4 generates deflection during kneading of the material to be kneaded is different from the direction (vertical direction) perpendicular to the arranged direction of the axes of both screws 4, 4, the inner wall surface 6g may be constituted so that the diameter of the accommodating space 6b becomes larger to match the deflection occurring direction of the screw 4.

Although in the above embodiment the barrel 6 is comprised of plural barrel segments 6f connected together in the axial direction of the barrel, the barrel 6 may be constituted by a single member which is continuous in the axial direction. In this case, each accommodating space 6b in the barrel 6 may be provided partially in its axial direction with a larger-diameter portion formed in such a manner that the diameter in the deflection occurring direction of the screw 4 is larger than in any other direction. Preferably, the larger-diameter portion is formed so as to accommodate at least the first kneading section 12.

In the above embodiment all the barrel segments 6f which constitute the barrel 6 are formed so that the diameter of each accommodating space 6b is larger in the vertical direction in which the screw 4 accommodated in the space 6b generates deflection than in any other direction. That is, the accommodating spaces 6b in all the barrel segments 6f are made the larger-diameter portions defined in the present invention. However, a modification may be made such that only the accommodating space(s) 6b in a selected barrel segment or segments 6f out of all the barrel segments 6f is/are the larger-diameter portion(s) having a diameter larger in the vertical direction in which the screws 4 accommodated therein generate deflection than in any other direction.

Thus, in the case where the barrel 6 is made up of plural barrel segments 6f connected together in the axial direction and a selected barrel segment or segments 6f out of the barrel segments 6f is/are the barrel segment(s) 6f having the larger-diameter portions, the larger-diameter portions can be disposed at an arbitrary axial position of the barrel 6 by changing the position(s) of the barrel segment(s) 6f having the larger-diameter portions as necessary. Therefore, in comparison with the case where the barrel 6 is constituted by a single member which is continuous in the axial direction, the position having the larger-diameter portions can be changed easily in conformity with the portion of each screw wherein large deflection occurs. According to this construction only the accommodating space(s) 6b in a selected barrel segment or segments 6f out of all the barrel segments 6f become(s) the larger-diameter portion(s), so it is possible to decrease the number of barrel segments 6f having the larger-diameter portions the machining of which is troublesome in comparison with the case where the accommodating spaces 6b in all the barrel segments 6f are the larger-diameter portions as the described embodiment.

Further, only the accommodating space 6b in the barrel segment 6f which accommodates the first kneading sections 12 of the screws 4 generating large deflection may be the large-diameter portions having a diameter larger in the vertical direction in which there occurs deflection of each screw 4 than in any other direction and the accommodating spaces 6b in the remaining barrel segments 6f may be formed in a circular-arc shape having a uniform diameter.

According to this construction it is possible to reduce the number of barrel segments 6f having the larger-diameter potions requiring troublesome machining out of all the barrel segments 6f while effectively diminishing contact between each kneading section 12 and the inner wall surface 6g of the barrel 6 which is attributable to the large deflection of the first kneading section 12.

We claim:

1. A kneader comprising:
   a pair of screws disposed in parallel with each other;
   a barrel having a kneading space for accommodating said pair of screws in the interior thereof; and
   a drive unit for rotating said pair of screws about respective axes thereof,
   the kneader kneading a material to be kneaded introduced into said kneading space by rotating said screws about the respective axes thereof, wherein
   each of said screws has a shape generating deflection in a specific direction orthogonal to the axis thereof during kneading of the material to be kneaded; and
   said kneading space has a shape such that a pair of accommodating spaces for accommodating said screws respectively are connected together so as to overlap each other partially in a radial direction, each of said accommodating spaces having a larger-diameter portion in at least a portion in the axial direction of said screws, said larger-diameter portion of being formed in such a manner that a diameter thereof in said specific direction is larger than in any other direction and said barrel having an inner wall surface which surrounds said larger-diameter portion has a plane portion extending in said predetermined direction in which each of said screws generates deflection, and
   a ratio L/C is greater than 1, wherein L is the length of said plane portion in said predetermined direction, C is a clearance between the outermost periphery portion of said screws and said plane portion of the inner wall surface of said barrel which surrounds said larger-diameter portion with said screws accommodated therein.

2. A kneader according to claim 1, wherein said pair of screws are formed in a mutually equal shape and are arranged in such a manner that rotating paths of outermost periphery portions thereof intersect each other during rotation, and
   said drive unit causes said pair of screws to rotate in same direction while maintaining a phase difference so as not to induce interference of both said screws.

3. A kneader according to claim 1, wherein each of said screws has a plurality of kneading sections separately disposed in the axis direction thereof for kneading the material to be kneaded, said barrel has an inlet port for introducing the material to be kneaded into said kneading space formed in the interior thereof, and said larger-diameter portion is formed so as to accommodate at least one of said kneading sections disposed closest to said inlet port out of said plurality of kneading sections.

4. A kneader according to claim 1, wherein said barrel includes a plurality of barrel segments connected together in the axial direction of the barrel to form said kneading space, at least one of said barrel segments having said larger-diameter portion.

5. A kneader according to claim 4, wherein each of said screws has a plurality of kneading sections separately disposed in the axis direction thereof for kneading the material to be kneaded, said barrel has an inlet port for introducing the material to be kneaded into said kneading space formed in the interior thereof, and one of said plurality of barrel segments which accommodates one of said kneading sections disposed closest to said inlet port has said larger-diameter portion.

6. A kneader according to claim 1, wherein each of said screws has a plurality of kneading sections separately disposed in the axis direction thereof for kneading the material to be kneaded, said barrel has an inlet port for introducing the material to be kneaded into said kneading space formed in the interior thereof, and said larger-diameter portion is formed so as to accommodate at least one of said kneading sections disposed closest to said inlet port out of said plurality of kneading sections.

7. A kneader according to claim 2, wherein each of said screws has a plurality of kneading sections separately disposed in the axis direction thereof for kneading the material to be kneaded, said barrel has an inlet port for introducing the material to be kneaded into said kneading space formed in the interior thereof, and said larger-diameter portion is formed so as to accommodate at least one of said kneading sections disposed closest to said inlet port out of said plurality of kneading sections.

8. A kneader according to claim 1, wherein each of said screws has a plurality of kneading sections separately disposed in the axis direction thereof for kneading the material to be kneaded, said barrel has an inlet port for introducing the material to be kneaded into said kneading space formed in the interior thereof, and said larger-diameter portion is formed so as to accommodate at least one of said kneading sections disposed closest to said inlet port out of said plurality of kneading sections.

9. A kneader according to claim 1, wherein said barrel includes a plurality of barrel segments connected together in the axial direction of the barrel to form said kneading space, at least one of said barrel segments having said larger-diameter portion.

10. A kneader according to claim 2, wherein said barrel includes a plurality of barrel segments connected together in the axial direction of the barrel to form said kneading space, at least one of said barrel segments having said larger-diameter portion.

11. A kneader according to claim 1, wherein said barrel includes a plurality of barrel segments connected together in the axial direction of the barrel to form said kneading space, at least one of said barrel segments having said larger-diameter portion.

12. A kneader according to claim 9, wherein each of said screws has a plurality of kneading sections separately disposed in the axis direction thereof for kneading the material to be kneaded, said barrel has an inlet port for introducing the material to be kneaded into said kneading space formed in the interior thereof, and one of said plurality of barrel segments which accommodates one of said kneading sections disposed closest to said inlet port has said larger-diameter portion.

13. A kneader according to claim 10, wherein each of said screws has a plurality of kneading sections separately disposed in the axis direction thereof for kneading the material to be kneaded, said barrel has an inlet port for introducing the material to be kneaded into said kneading space formed in the interior thereof, and one of said plurality of barrel segments which accommodates one of said kneading sections disposed closest to said inlet port has said larger-diameter portion.

14. A kneader according to claim 11, wherein each of said screws has a plurality of kneading sections separately disposed in the axis direction thereof for kneading the material to be kneaded, said barrel has an inlet port for introducing the material to be kneaded into said kneading space formed in the interior thereof, and one of said plurality of barrel segments which accommodates one of said kneading sections disposed closest to said inlet port has said larger-diameter portion.

15. A kneader according to claim 1, having said ratio L/C in a range of 1 to 4.

16. A kneader according to claim 1, having an aperture for dearation configured to allow communication of a gas from an accommodating space.

17. A kneader, comprising:

a pair of screws disposed in parallel with each other;

a barrel having a kneading space for accommodating said pair of screws in the interior thereof and an aperture for dearation; and said screws and barrel configured to have a first kneading space and a second kneading space, said first kneading space and said second kneading space each having a portion which is in communication with said aperture for release of a gas through said aperture, a drive unit for rotating said pair of screws about respective axes thereof, the kneader kneading a material to be kneaded introduced into said kneading space by rotating said screws about the respective axes thereof, wherein each of said screws has a shape generating deflection in a specific direction orthogonal to the axis thereof during kneading of the material to be kneaded; and said kneading space has a shape such that a pair of accommodating spaces for accommodating said screws respectively are connected together so as to overlap each other partially in a radial direction, each of said accommodating spaces including a larger-diameter portion in at least a portion in the axial direction of said screws, said larger-diameter portion being formed in such a manner that a diameter thereof in said specific direction is larger than in any other direction and said barrel having an inner wall surface which surrounds said larger diameter portion has a plane portion extending in said predetermined direction in which each of said screws generates deflection, and a ratio L/C is greater than 1, wherein L is the length of said plane portion in said predetermined direction, C is a clearance between the outermost periphery portion of said screws and said plane portion of the inner wall surface of said barrel which surrounds said larger-diameter portion with said screws accommodated therein.

18. A kneader according to claim 16, wherein an aperture is configured to allow communication of a gas from an accommodating space.

* * * * *